United States Patent [19]

Wajima

[11] Patent Number: 4,801,856
[45] Date of Patent: Jan. 31, 1989

[54] ROBOT CONTROL APPARATUS
[75] Inventor: Hiroki Wajima, Akishima, Japan
[73] Assignee: Kabushiki Kaisha Toshiba, Kawasaki, Japan
[21] Appl. No.: 40,873
[22] Filed: Apr. 21, 1987
[30] Foreign Application Priority Data
Apr. 22, 1986 [JP] Japan ................ 61-59692[U]
[51] Int. Cl.⁴ .............................. G05B 19/42
[52] U.S. Cl. ............................ 318/568; 318/364; 318/369; 318/302; 901/49
[58] Field of Search ............... 361/23, 28, 29; 318/302, 563, 565, 568, 606, 362–369, 370–371, 373–382, 626; 901/49

[56] References Cited
U.S. PATENT DOCUMENTS 3,906,299  9/1975  Mittelstaedt ............... 318/377
3,906,315  9/1975  Gotisar ...................... 318/369
4,426,606  1/1984  Suita et al. ................ 318/375
4,629,949 12/1986  Senso ........................ 318/374

Primary Examiner—William M. Shoop, Jr.
Assistant Examiner—David Martin
Attorney, Agent, or Firm—Foley & Lardner, Schwartz, Jeffery, Schwaab, Mack, Blumenthal & Evans

[57] ABSTRACT

A position of an actuation unit of a robot and a speed of a motor for driving the actuation unit are detected. A speed reference is produced on the basis of a deviation between a movement value and a position detected. Further, a torque reference is produced on the basis of a deviation between the speed reference and a speed detected. The motor for driving the actuation unit is subjected to current control. The magnitude of the torque reference is limited by a limiter. This limiter operates only when a command for allowing the robot to be subjected to emergency stop is received, and carries out limiting operation on the basis of a function which rises from the time point when the command is received.

8 Claims, 4 Drawing Sheets

ROBOT CONTROL APPARATUS

BACKGROUND OF THE INVENTION

The present invention relates to a robot control apparatus having a function to smoothly stop the robot arm at a time of emergency stop.

In general, there are provided in robots a position detector for detecting the position of an actuation unit and a speed detector for detecting a speed of a motor which drives the actuation unit. A position control unit constituting the robot control apparatus produces a speed reference on the basis of a deviation between a predetermined movement value and a position detection value. Thus, the speed control unit produces a torque reference on the basis of a deviation between this speed reference and a speed detection value. The motor for actuating the robot is subjected to current control on the basis of the torque reference thus produced.

In the event that an abnormal condition occurs in the robot, it is required to conduct emergency stop. In this case, a command for allowing the speed reference to be forcedly equal to zero is produced. However, when such a step-like-change occurs in the speed reference, the torque reference also abruptly varies. As a result, vibration will occur until the actuation unit of the robot is completely stopped. Particularly, according as robots become large-sized in recent years, there is a tendency that robots of lower rigidity are employed. Under these circumstances, such a vibration of the actuation unit results in the problem that work is dropped off or the actuation unit is broken. While such a vibration can be prevented by preparing a program such that the speed reference is smoothly changed to zero, it is not preferable to take a countermeasure for occurrence of abnormal conditions using a program because safety is injured. Accordingly, it is inevitable to cause the speed reference to be forcedly equal to zero for carrying out emergency stop in safety. For this reason, vibration of the robot actuation unit at the time of emergency stop has become serious problem in the art.

SUMMARY OF THE INVENTION

With the above in mind, an object of the present invention is to provide a robot control apparatus capable of smoothly stopping the robot in safety at the time of emergency stop.

The above object is achieved by providing a robot control apparatus comprising a position detector (10) for detecting a position of an actuation unit of the robot, a position control unit (3) for producing a speed reference on the basis of a deviation between a detection value of the position detector (10) and a predetermined movement value, a speed detector (9) for detecting a speed of a motor for driving the actuation unit, a speed control unit (4) for producing a torque reference on the basis of a deviation between a detection value of the speed detector (9) and the speed reference, and a current control unit (5) for controlling a current delivered to the motor on the basis of the torque reference, characterized by the provision of a function generator (11) for generating a function (F) which abruptly increases at its function value from the time pont when a command for allowing the robot to be subjected to emergency stop is received, a limiter (12) for limiting the magnitude of the torque reference on the basis of the function (F), and a switch (13) for allowing the limiter (12) to be operative only when the command is received.

DETAILED DESCRIPTION OF THE PREFERRED EMBODIMENT

Figure 1:
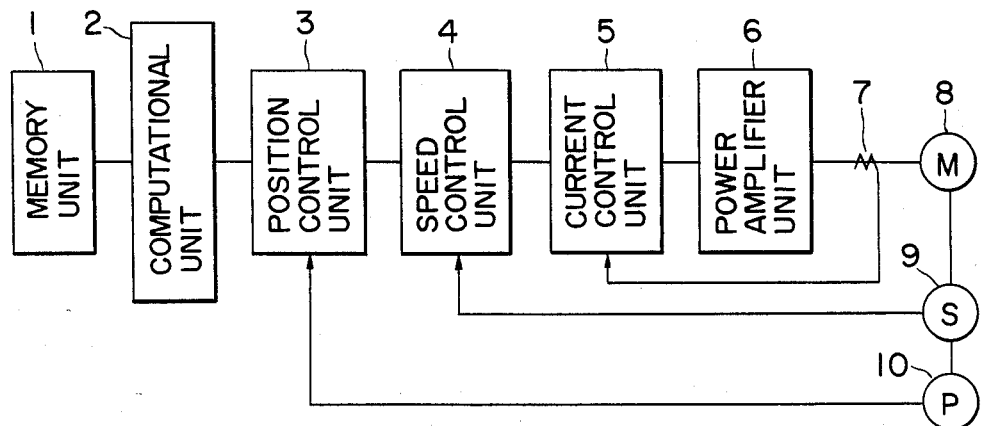
FIG. 1 is a block diagram illustrating a basic arrangement of a typical robot control apparatus conventionally employed.

Initially, an arrangement of a conventional robot control apparatus is shown in FIG. 1 for comparison with that of the present invention.

Referring to this figure, teaching position data and work sequence data stored in a memory unit 1 are decoded by a computational unit 2. Thus, movement values of every respective axes of the robot are calculated and than are sent to a position control unit 3.

The position control unit 3 outputs a speed reference proportional to a position deviation on the basis of a movement value calculated at the computational unit 2 and a feedback quantity from the detector 10 for detecting a movement value of the motor 8.

A speed control unit 4 outputs, as a torque reference, a voltage proportional to a difference between a speed reference and a rotational number of the motor 8 to a current control unit 5 on the basis of the speed reference from the position control unit 3 and a feedback quantity from a detector 9 for detecting the rotational number of the motor 8.

If disturbance such as a load change occurs, so that the number of rotations of the motor 8 lowers, the feedback quantity from the detector 9 also lowers. As a result, the torque reference increases, thus causing the motor 8 to be accelerated to return its speed to the original speed.

In contrast, when the rotational number of the motor increases, a feedback quantity from the detector 9 also increases. As a result, the torque reference decreases, thus causing the motor 8 to be decelerated to return its speed to the original speed.

The current control unit 5 calculates a current which is caused to flow through the motor 8 from the torque reference given from the speed control unit 4 and a feedback quantity given from the detector 7 for detecting a motor current and then the unit 5 outputs the current thus calculated to a power amplifier unit 6 as a current reference. This current reference is limited to a value which does not exceed a maximum allowed current of the motor 8.

The power amplifier unit 6 causes a current proportional to the current reference to flow through the motor 8. Thus, the motor 8 rotates by a movement quantity calculated at the computational unit 2 at a speed corresponding to the speed reference.

When the movement is completed, the computational unit 2 reads teaching position data to be executed next time to control the rotation of the motor 8 in accordance with the same procedure.

It is now assumed that a robot of lower rigidity is contorlled with a robot control apparatus thus configured. Where the speed reference is caused to change in a step manner as shown in FIG. 2(a), the torque reference is expressed as follows:

Torque reference=K·(speed reference−feedback quantity of the detector 9)

where K denotes a proportional constant.

Figure 2:
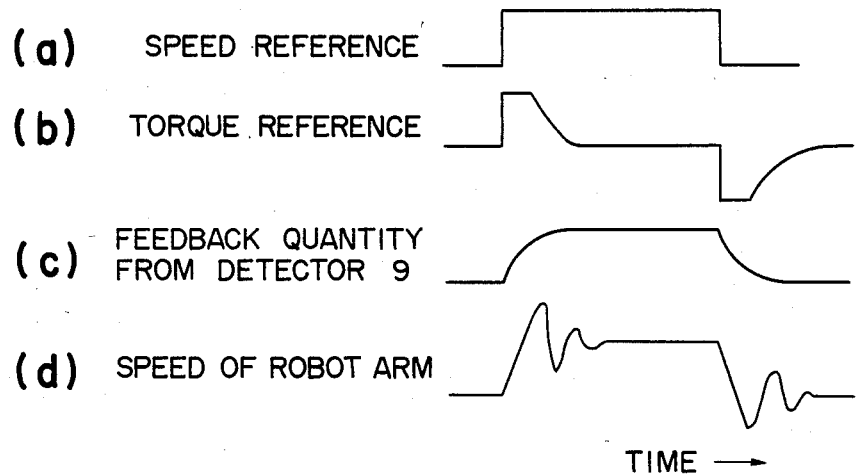
FIGS. 2 and 3 show signal waveforms for explaining the operation of the apparatus shown in FIG. 1.

The torque reference is in the output saturated condition at first as shown in FIG. 2(b). Then, according as the speed of the motor 8 increases, the torque reference lowers. Thus, a torque reference sufficient to rotate the motor 8 at a speed reference is produced, whereby the rotational movement of the motor 8 is stabilized.

At the time of deceleration, the output saturated condition is also continued at first in the same manner. Then, according as the speed of the motor 8 decreases, the torque reference also varies in a direction of zero level.

When the speed reference varies in a step manner as described above, a maximum allowed current flows in the motor 8, thus making an attempt to accelerate or decelerate the motor 8 at a maximum torque. Accordingly, the speed of the motor 8 abruptly changes as shwon in FIG. 2(c), thus exerting an impact on the robot arm. As a result, the robot arm vibrates as shown in FIG. 2(d), the positioning time is prolonged, the work is dropped off, or a load more than an allowed value is applied to the robot because of vibration, resulting in the possibility that the robot is broken.

For this reason, there is employed in general a method to prepare a speed reference by calculation so that the robot arm is activated in accordance with the smoothest acceleration and deceleration patterns in the position control unit 3. A smooth speed reference is given, for example, as shown in FIG. 3(a) to allow an acceleration pattern obtained by differentiating the speed reference to be trapezoidal as shown in FIG. 3(b), thus preventing the vibration of the robot.

Although the above-mentioned prior art does not cause any problems in a normal running condition, there occurs problems when an attempt is made to conduct emergency stop because of occurrence of any abnormal condition.

Figure 3:
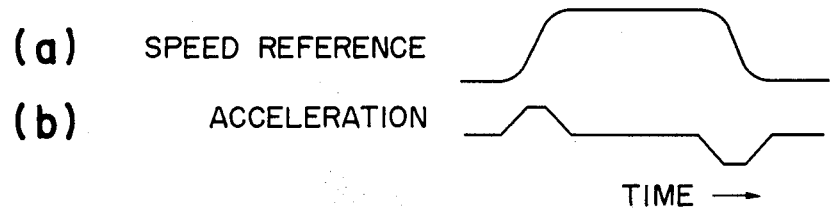

Namely, the deceleration curve as shown in FIG. 3(a) is given by software, but when high reliability is required as in the case of emergency stop and it is required to constitute a circuit therefor with hardware without making use of software, the circuit becomes complicated. This is not acceptable in practical use.

Accordingly, at the time of emergency stop, a main circuit (not shown) of the power amplifier unit 6 is interrupted and the speed reference as shown in FIG. 2(a) is to be delivered to the speed control unit 4 at the same time.

For this reason, the robot arm produces a large vibration as shown in FIG. 2(d). Thus, according as the robot becomes large-sized and has lower rigidity, there occur the problems that work is dropped off, the robot is broken or the like.

The present invention contemplates provision of a stable robot control apparatus capable of smoothly stopping the robot arm even when emergency stop is required by providing a limiter at the output stage of the current control unit 5.

Figure 4:
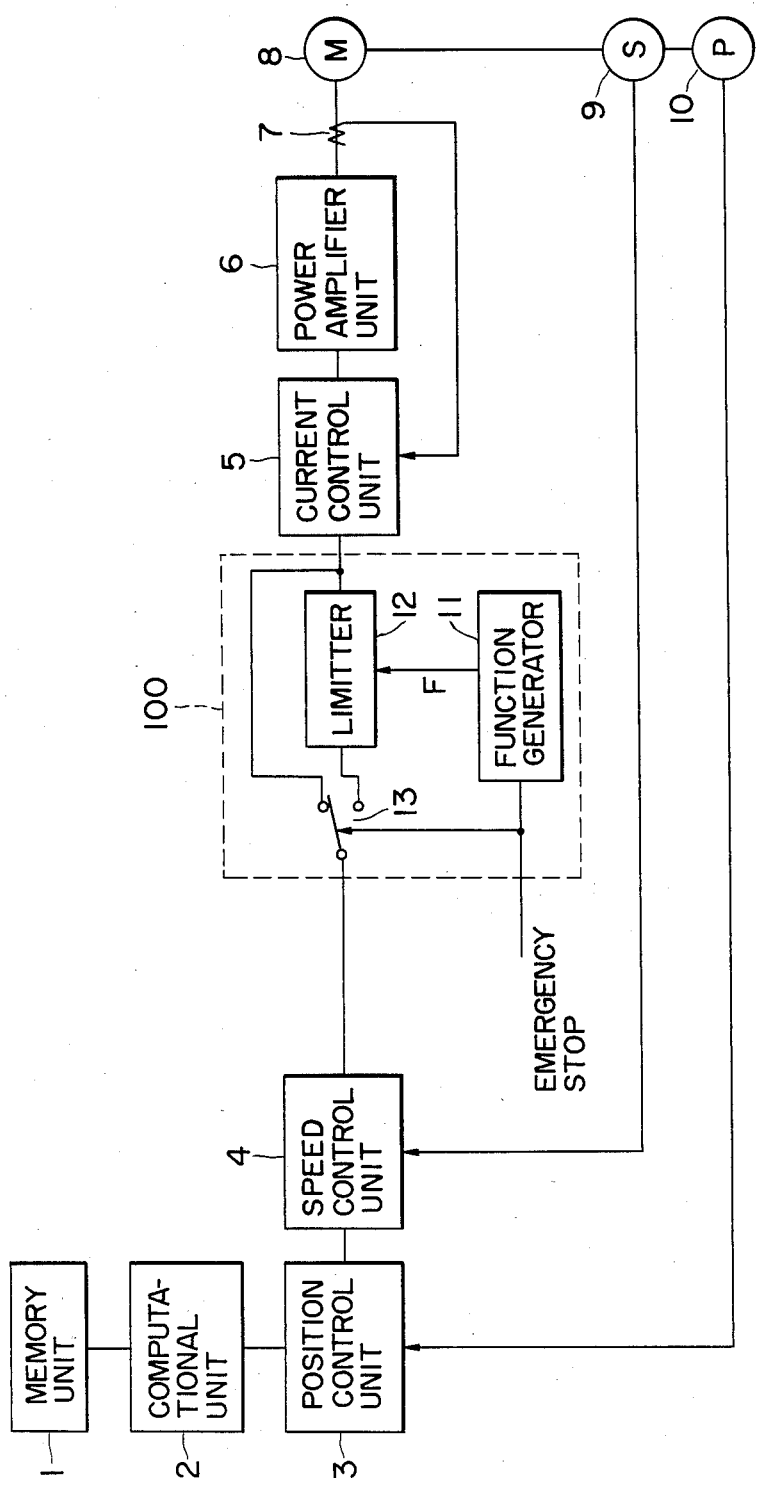
FIG. 4 is a block diagram illustrating an arrangement of an embodiment of a robot control apparatus according to the present invention.

Referring to FIG. 4, there is shown an embodiment of a robot control apparatus according to the present invention. This apparatus is characterized in that a limiter circuit 100 is newly added between the speed control unit 4 and the current control unit 5 which are shown in FIG. 1.

In this figure, a limiter 12 is bypassed by a switch 13 in a normal condition. The circuit in this condition performs completely the same operation as that of the conventional circuit shown in FIG. 1.

At the time of emergency stop, the switch 13 is switched to the side of the limiter 12. Thus, a torque reference output from the speed control unit 4 is input to the limiter 12, and the function generator 11 generates an optimum torque limit reference function F such that the robot arm is stopped in a short time without causing vibration to output the function F to the limiter 12.

Figure 5:
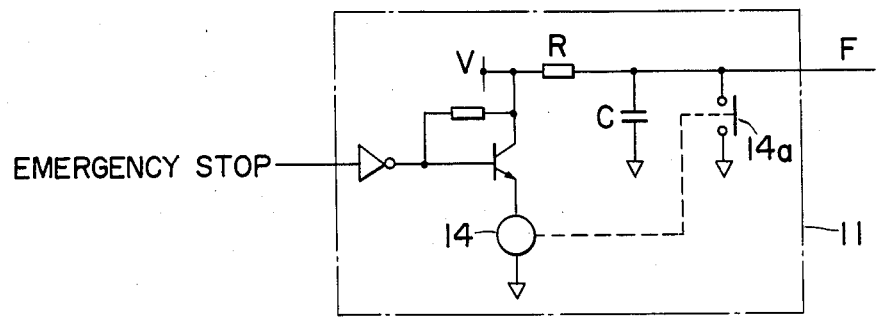
FIG. 5 is a circuit diagram illustrating one example of a circuit arrangement of a function generator 11 provided in the apparatus shown in FIG. 4.

FIG. 5 shows an example of the above-mentioned function generator 11. When a command indicative of emergency stop is produced as shown in FIG. 6(a), a relay 14 is deenergized. As a result, a contact 14a which has maintained the output F at zero level is opened. Thus, an exponential function expressed as $F=V(1-\exp(-t/CR))$ as shown in FIG. 6(b) is output as the torque reference function F, where V, R and C represent a voltage value of the power supply V, a resistance value of the resistor R, and a capacitance value of the capacitor C in FIG. 5, respectively.

Figure 6:
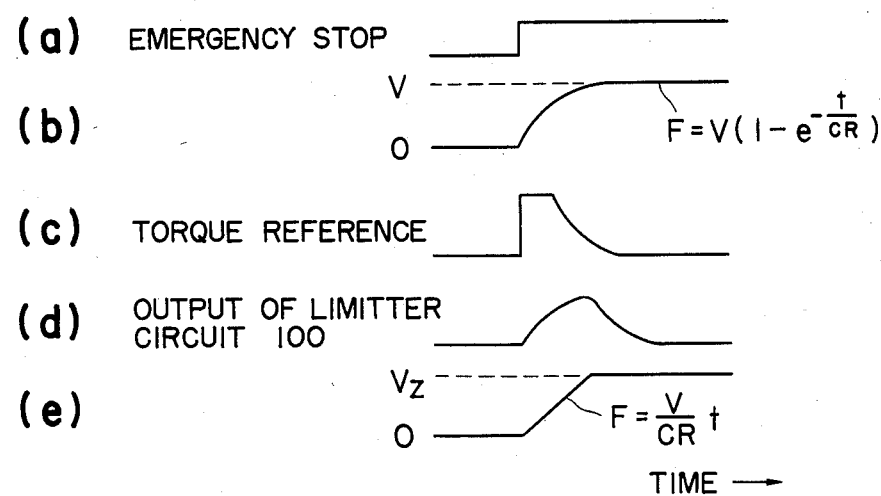
FIG. 6 shows signal waveforms for explaining the operation of the apparatus shown in FIG. 4.

The limiter 12 limits the torque reference as shown in FIG. 6(Ic), which has been output from the speed control unit 4, to a value having its upper limit equal to the output F of the function generator 11 to output a signal thus obtained as shown in FIG. 6(d) to the current control unit 5. Thus, a smooth stop free from vibration is carried out.

Figure 7:
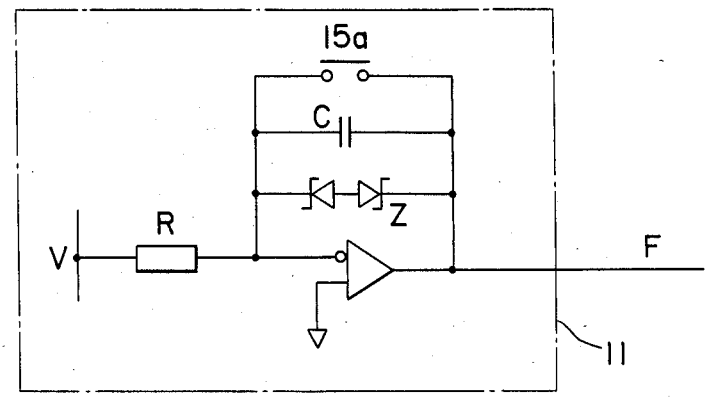
FIG. 7 is a circuit diagram illustrating another example of a circuit arrangement of a function generator 11 providing in the apparatus shown in FIG. 4.

FIG. 7 is a circuit diagram illustrating another example of the function generator 11. When an emergency stop occurs, a contact 15a is opened, whereby function as shown in FIG. 6(e) is output. This output function F rises with a gradient of V/CR and has a waveform clipped by a breakdown voltage $V_z$ of a Zener diode Z.

Figure 8:
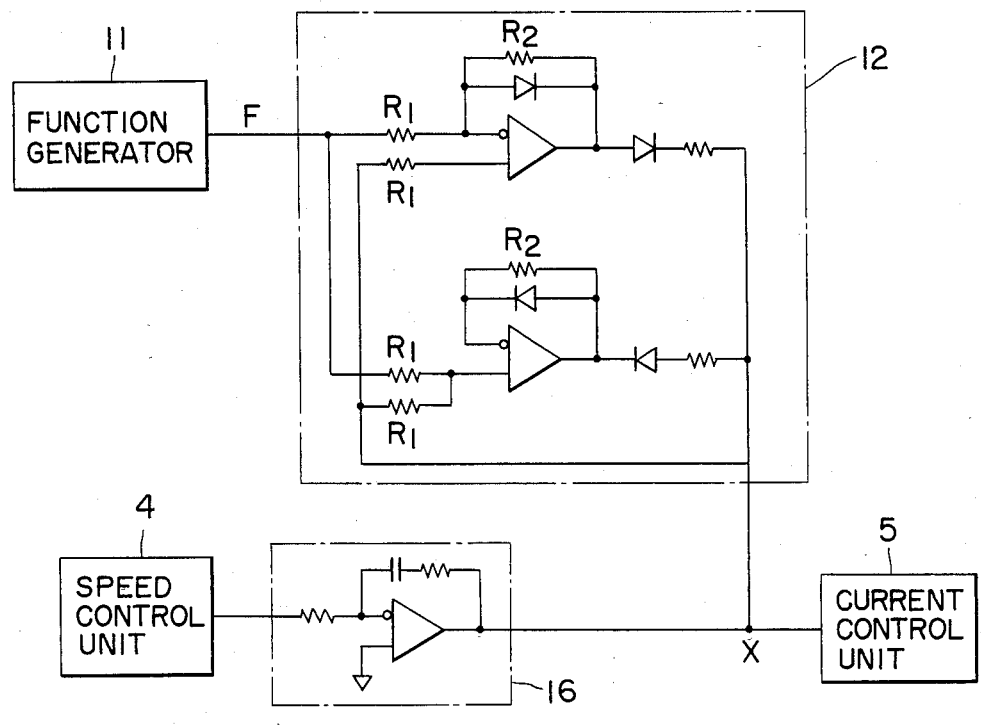
FIG. 8 is a circuit diagram illustrating one example of a circuit arrangement of a limiter 12 of the apparatus shown in FIG. 4.

FIG. 8 is a circuit diagram illustrating an example of an actual circuit arrangement of the limiter 12. This circuit arrangement is characterized in that a buffer unit 16 comprised of an operational amplifier is connected between the speed control unit 4 and the current control unit 5, and in that the limiter 12 is connected to a junction X of the buffer unit 16 and the current control unit 5. A function F generated by the function generator 11 is delivered to the limiter 12. The limiter 12 is composed of two operational amplifiers for performing respective limiting operations on the positive and negative sides. In this circuit, settings are made such that $F>0$ and $R_1<<R_2$.

As apparent from the foregoing description, the robot control apparatus according to the present invention is implemented such that even if the speed reference is caused to be low as shown in FIG. 2(a) at the time of emergency stop, the torque reference delivered to the current control unit functions to reduce vibration of the robot arm and varies as a function to stop the robot arm as short as possible.

Namely, when the function generator shown in FIG. 5 or FIG. 7 is employed, a braking torque gradually increases from the free running condition where the braking torque is equal to zero at first as shown in FIG. 6(b) or FIG. 6(e) at the time of occurrence of emergency stop to remove discontinuity of speed changes, thus making it possible to suppress a shock or an impact to the robot arm to prevent occurrence of vibration.

What is claimed is:

1. A robot control apparatus comprising:
    a position detector for detecting a position of an actuation unit of the robot;
    a position control unit for producing a speed reference on the basis of a deviation between a detection value of said position detector and a predetermined movement value;
    a speed detector for detecting a speed of a motor for driving said actuation unit;
    a speed control unit for producing a torque reference on the basis of a deviation between a detection value of said speed detector and said speed reference;
    a current control unit for controlling a current delivered to said motor on the basis of said torque reference;
    a function generator for generating a function which moderately increases its function value from a point in time when a command for allowing said robot to be subjected to an emergency stop is received;
    a limiter for limiting the magnitude of said torque reference on the basis of said function; and
    a switch for allowing said limiter to be operative only when said command is received.

2. A robot control apparatus as set forth in claim 1, wherein said function generator generates a function which exponentially increases.

3. A robot control apparatus as set forth in claim 2, wherein said function is generated on the basis of a time constant determined by a resistor and a capacitor.

4. A robot control apparatus as set forth in claim 1, wherein said function generator generates a function which linearly increases.

5. A robot control apparatus as set forth in claim 2, wherein said function does not increase its function value beyond a predetermined value by making use of a breakdown voltage of a Zener diode.

6. A robot control apparatus as set forth in claim 4, wherein said function does not increase its function value beyond a predetermined value by making use of a breakdown voltage of a Zener diode.

7. A robot control apparatus comprising:
    a position detector for detecting a position of an actuation unit of the robot;
    a position control unit for producing a speed reference on the basis of a deviation between a detection value of said position detector and a predetermined movement value;
    a speed detector for detecting a speed of a motor for driving said actuation unit;
    a speed control loop for producing a torque reference on the basis of a deviation between a detection unit of said speed detector and said speed reference;
    a current control loop for controlling a current delivered to said motor on the basis of said torque reference;
    a function generator for generating, when a command indicative of an emergency stop is produced, a function output of said torque reference which moderately increases its function value up to a predetermined function value;
    a limiter for limiting the magnitude of said torque reference on the basis of said function; and
    a switch for allowing said limiter to be operative only when said command is received.

8. The robot control apparatus as set forth in claim 7 wherein said function avoids an increase of its function value beyond the predetermined function value by making use of a breakdown voltage of a Zener diode.

* * * * *